United States Patent
Kimura et al.

(10) Patent No.: US 12,290,797 B2
(45) Date of Patent: May 6, 2025

(54) METHODS OR PRODUCING CARBON DIOXIDE SORBENTS FOR INDOOR AIR QUALITY CONTROL

(71) Applicant: BASF Corporation, Florham Park, NJ (US)

(72) Inventors: Riichiro Kimura, Jersey City, NJ (US); Mark T. Buelow, Flemington, NJ (US); John Kauffman, Hazlet, NJ (US); Pascaline Tran, Holmdel, NJ (US); Aron Wosylus, Lauffen am Neckar (DE)

(73) Assignee: BASF Corporation, Florham Park, NJ (US)

( * ) Notice: Subject to any disclaimer, the term of this patent is extended or adjusted under 35 U.S.C. 154(b) by 363 days.

(21) Appl. No.: 17/154,507

(22) Filed: Jan. 21, 2021

(65) Prior Publication Data
US 2021/0138437 A1    May 13, 2021

Related U.S. Application Data

(62) Division of application No. 15/560,559, filed as application No. PCT/US2016/023727 on Mar. 23, 2016, now Pat. No. 10,906,024.

(Continued)

(51) Int. Cl.
*B01J 20/32* (2006.01)
*B01D 53/02* (2006.01)
(Continued)

(52) U.S. Cl.
CPC .......... *B01J 20/3204* (2013.01); *B01D 53/02* (2013.01); *B01D 53/0415* (2013.01);
(Continued)

(58) Field of Classification Search
CPC .. B01J 20/3204; B01J 20/12; B01J 20/28004; B01J 20/28011; B01J 20/28045; B01J 20/28059; B01J 20/28061; B01J 20/28069; B01J 20/3078; B01J 20/3206; B01J 20/3236; B01J 20/3248; B01J 20/3251;
(Continued)

(56) References Cited

U.S. PATENT DOCUMENTS

| 4,443,354 A | 4/1984 | Eian |
| 5,206,204 A | 4/1993 | Tsutsumi et al. |

(Continued)

FOREIGN PATENT DOCUMENTS

| CN | 101279237 | 10/2008 |
| CN | 101288847 | 10/2008 |

(Continued)

OTHER PUBLICATIONS

Wu, Xiao M. , et al, "Identifying the CO2 Capture Performance of CaCl2-Supported Amine Adsorbent by the Improved Field Synergy Theory", Industrial & Engineering Chemistry Research, (2014), 53(24), 10225-10237, 1 page.

(Continued)

*Primary Examiner* — Thuan D Dang
(74) *Attorney, Agent, or Firm* — Lowenstein Sandler LLP

(57) ABSTRACT

Disclosed in certain embodiments are carbon dioxide sorbents that include porous particles impregnated with an amine compound.

19 Claims, 9 Drawing Sheets

Related U.S. Application Data

(60) Provisional application No. 62/250,300, filed on Nov. 3, 2015, provisional application No. 62/136,918, filed on Mar. 23, 2015.

(51) Int. Cl.

| | | |
|---|---|---|
| *B01D 53/04* | (2006.01) | |
| *B01D 53/62* | (2006.01) | |
| *B01D 53/82* | (2006.01) | |
| *B01J 20/12* | (2006.01) | |
| *B01J 20/28* | (2006.01) | |
| *B01J 20/30* | (2006.01) | |
| *B01J 20/34* | (2006.01) | |

(52) U.S. Cl.
CPC ............ *B01D 53/62* (2013.01); *B01D 53/82* (2013.01); *B01J 20/12* (2013.01); *B01J 20/28004* (2013.01); *B01J 20/28011* (2013.01); *B01J 20/28045* (2013.01); *B01J 20/28059* (2013.01); *B01J 20/28061* (2013.01); *B01J 20/28069* (2013.01); *B01J 20/3078* (2013.01); *B01J 20/3206* (2013.01); *B01J 20/3236* (2013.01); *B01J 20/3248* (2013.01); *B01J 20/3251* (2013.01); *B01J 20/3257* (2013.01); *B01J 20/327* (2013.01); *B01J 20/3272* (2013.01); *B01J 20/3289* (2013.01); *B01J 20/3433* (2013.01); *B01J 20/3458* (2013.01); *B01D 2253/20* (2013.01); *B01D 2253/202* (2013.01); *B01D 2253/25* (2013.01); *B01D 2257/504* (2013.01); *B01D 2257/708* (2013.01); *B01D 2258/06* (2013.01); *B01D 2259/4508* (2013.01); *B01D 2259/4566* (2013.01); *B01D 2259/4575* (2013.01); *B01J 2220/62* (2013.01); *Y02C 20/40* (2020.08)

(58) Field of Classification Search
CPC .. B01J 20/3257; B01J 20/327; B01J 20/3272; B01J 20/3289; B01J 20/3433; B01J 20/3458; B01J 2220/62; B01J 20/22; B01J 20/10; B01J 20/28007; B01J 20/3246; B01D 53/02; B01D 53/0415; B01D 53/62; B01D 53/82; B01D 2253/20; B01D 2253/202; B01D 2253/25; B01D 2257/504; B01D 2257/708; B01D 2258/06; B01D 2259/4508; B01D 2259/4566; B01D 2259/4575; Y02C 50/40; Y02A 50/20

See application file for complete search history.

(56) References Cited

U.S. PATENT DOCUMENTS

| | | | |
|---|---|---|---|
| 5,376,614 | A | 12/1994 | Birbara et al. |
| 5,863,302 | A | 1/1999 | Carey et al. |
| 5,948,726 | A | 9/1999 | Moskovitz et al. |
| 5,962,379 | A | 10/1999 | Carey et al. |
| 5,981,797 | A | 11/1999 | Orth |
| 6,093,236 | A | 7/2000 | Klabunde et al. |
| 6,200,542 | B1 | 3/2001 | Poles et al. |
| 6,364,938 | B1 | 4/2002 | Birbara et al. |
| 6,547,854 | B1 | 4/2003 | Gray et al. |
| 6,670,304 | B2 | 12/2003 | Chang |
| 6,908,497 | B1 | 6/2005 | Sirwardane |
| 7,288,136 | B1 | 10/2007 | Gray et al. |
| 7,300,500 | B2 | 11/2007 | Okada et al. |
| 7,314,847 | B1 | 1/2008 | Siriwardane |
| 7,795,175 | B2 | 9/2010 | Olah et al. |
| 7,820,591 | B2 | 10/2010 | Ryu et al. |
| 8,247,346 | B2 | 8/2012 | England |
| 8,362,300 | B2 | 1/2013 | Pritschins et al. |
| 8,434,667 | B2 | 5/2013 | Winkle et al. |
| 8,491,705 | B2 | 7/2013 | Choi et al. |
| 8,491,710 | B2 | 7/2013 | Meirav |
| 8,496,734 | B2 | 7/2013 | Gadkaree et al. |
| 8,500,857 | B2 | 8/2013 | Eisenberger |
| 8,557,027 | B2 | 10/2013 | Peiffer et al. |
| 8,591,627 | B2 | 11/2013 | Jain |
| 8,597,411 | B2 | 12/2013 | Shahin et al. |
| 8,598,071 | B1 | 12/2013 | Baugh et al. |
| 8,647,412 | B2 | 2/2014 | Jiang et al. |
| 8,735,621 | B2 | 5/2014 | Corma et al. |
| 8,834,822 | B1 | 9/2014 | Gay et al. |
| 8,840,706 | B1 | 9/2014 | Srinivasachar |
| 8,871,018 | B2 | 10/2014 | Buri et al. |
| 9,102,595 | B2 | 8/2015 | Haag et al. |
| 9,227,153 | B2 | 1/2016 | Eisenberger |
| 9,266,051 | B2 | 2/2016 | Wright et al. |
| 9,272,262 | B2 | 3/2016 | Polshettiwar et al. |
| 9,333,485 | B1 | 5/2016 | Siriwardane |
| 9,399,187 | B2 | 7/2016 | Meirav et al. |
| 9,427,486 | B2 | 8/2016 | Soulie et al. |
| 9,440,928 | B2 | 9/2016 | Gupta et al. |
| 9,533,250 | B2 | 1/2017 | Meirav et al. |
| 9,566,545 | B2 | 2/2017 | Meirav et al. |
| 9,630,143 | B2 | 4/2017 | Eisenberger et al. |
| 9,649,618 | B2 | 5/2017 | Wang et al. |
| 9,682,361 | B2 | 6/2017 | Brandt et al. |
| 9,844,766 | B2 | 12/2017 | Eom et al. |
| 2003/0017464 | A1 | 1/2003 | Pohl |
| 2003/0097933 | A1 | 5/2003 | Choudary et al. |
| 2003/0232722 | A1 | 12/2003 | Kato et al. |
| 2004/0159605 | A1 | 8/2004 | Hughes |
| 2004/0197253 | A1 | 10/2004 | Twigg |
| 2005/0092176 | A1 | 5/2005 | Ding et al. |
| 2006/0165574 | A1 | 7/2006 | Sayari |
| 2008/0160276 | A1 | 7/2008 | Inoue et al. |
| 2008/0293976 | A1 | 11/2008 | Olah et al. |
| 2009/0288557 | A1 | 11/2009 | Carati et al. |
| 2010/0154636 | A1 | 6/2010 | Liu et al. |
| 2010/0218681 | A1 | 9/2010 | Yeager et al. |
| 2011/0158873 | A1 | 6/2011 | Riman et al. |
| 2011/0265648 | A1 | 11/2011 | Meirav |
| 2012/0063978 | A1 | 3/2012 | Baugh et al. |
| 2012/0070353 | A1 | 3/2012 | Trukhan et al. |
| 2012/0076711 | A1 | 3/2012 | Gebald et al. |
| 2012/0273720 | A1 | 11/2012 | Lee et al. |
| 2013/0052109 | A1 | 2/2013 | Davis et al. |
| 2013/0095996 | A1* | 4/2013 | Buelow ................ B01J 20/3272 502/402 |
| 2013/0121903 | A1 | 5/2013 | Gupta et al. |
| 2013/0178987 | A1 | 7/2013 | Meirav et al. |
| 2013/0207034 | A1 | 8/2013 | Addiego |
| 2013/0287662 | A1 | 10/2013 | Chuang |
| 2013/0294991 | A1 | 11/2013 | Jones et al. |
| 2013/0338001 | A1 | 12/2013 | Giannelis et al. |
| 2014/0107003 | A1 | 4/2014 | Gieselman et al. |
| 2014/0196631 | A1 | 7/2014 | McDaniel |
| 2014/0202183 | A1 | 7/2014 | Chadwick et al. |
| 2014/0241966 | A1 | 8/2014 | Khunsupat et al. |
| 2014/0271394 | A1 | 9/2014 | Jiang et al. |
| 2014/0298996 | A1 | 10/2014 | Meirav et al. |
| 2014/0311341 | A1 | 10/2014 | Jiang et al. |
| 2014/0312271 | A1 | 10/2014 | Siriwardane et al. |
| 2014/0312273 | A1 | 10/2014 | Wattebled et al. |
| 2014/0332720 | A1 | 11/2014 | Eom et al. |
| 2015/0078964 | A1 | 3/2015 | Meirav et al. |
| 2015/0251160 | A1 | 9/2015 | Choi et al. |
| 2015/0320786 | A1 | 11/2015 | Haag et al. |
| 2015/0352518 | A1 | 12/2015 | Meirav et al. |
| 2016/0074831 | A1 | 3/2016 | Begag et al. |
| 2016/0114337 | A1 | 4/2016 | Snead et al. |
| 2016/0114338 | A1 | 4/2016 | Snead |
| 2016/0175808 | A1 | 6/2016 | Seo et al. |
| 2016/0199810 | A1 | 7/2016 | Goeppert et al. |
| 2016/0228811 | A1 | 8/2016 | Meirav et al. |
| 2017/0014802 | A1 | 1/2017 | Hosomi et al. |
| 2017/0173523 | A1 | 6/2017 | Fehrmann et al. |
| 2017/0197198 | A1 | 7/2017 | Soukri et al. |

(56) References Cited

U.S. PATENT DOCUMENTS

| | | |
|---|---|---|
| 2017/0252693 A1 | 9/2017 | Kuroda et al. |
| 2017/0296961 A1 | 10/2017 | Beaumont et al. |
| 2017/0304764 A1 | 10/2017 | Goeppert et al. |

FOREIGN PATENT DOCUMENTS

| | | | | |
|---|---|---|---|---|
| CN | 101623621 | 1/2010 | | |
| CN | 101973558 | 2/2011 | | |
| CN | 102908984 | 2/2013 | | |
| CN | 103120927 | 5/2013 | | |
| CN | 103418356 | 12/2013 | | |
| CN | 103920463 | 7/2014 | | |
| CN | 103990442 | 8/2014 | | |
| CN | 104475062 | 4/2015 | | |
| CN | 105498720 | 4/2016 | | |
| EP | 1293249 | 3/2003 | | |
| EP | 2558194 | 2/2013 | | |
| JP | H1085585 | 4/1998 | | |
| JP | 2000356022 | 12/2000 | | |
| JP | 2001025660 | 1/2001 | | |
| JP | 2001190950 | 7/2001 | | |
| JP | 2004105854 | 4/2004 | | |
| JP | 4273686 | 6/2009 | | |
| JP | 2012139622 | 7/2012 | | |
| JP | 6055134 | 12/2016 | | |
| KR | 20050012600 | 2/2005 | | |
| KR | 100898500 | 5/2009 | | |
| KR | 20120021899 | 3/2012 | | |
| KR | 20130047256 | 5/2013 | | |
| KR | 20150069268 | 6/2015 | | |
| KR | 101628033 | 6/2016 | | |
| KR | 101638109 | 7/2016 | | |
| RU | 2001660 | 10/1993 | | |
| WO | 2007074816 | 7/2007 | | |
| WO | 2012043942 | 4/2012 | | |
| WO | WO-2012158911 A2 * | 11/2012 | ........... | B01D 53/025 |
| WO | 2013152071 | 10/2013 | | |
| WO | 2016208718 | 12/2016 | | |

OTHER PUBLICATIONS

International Search Report and Written opinion dated Jun. 16, 2016 for International Application No. PCT/US2016/23727, 21 pages.

* cited by examiner

[1] 33% DEA / 67% clay support

[2] 36% DEA / 64% clay support

[3] 28% DEA / 72% clay support

[4] 12% DEA / 15% PEHA / 73% clay support

[5] 10% DEA / 13% PEHA / 77% clay support

[6] 10% DEA / 11% PEHA / 3% glycerol / 77% clay support

[1] 30% DEA / 1% NaOH / 69% AG160

[2] 22% DEA / 1% NaOH / 77% AG160

[3] 33% DEA / 67% clay support

[4] 12% DEA / 16% TEPA / 73% clay support

[5] 12% DEA / 15% PEHA / 73% clay support

[6] 26% TEPA / 73% clay support

[7] 26% PEHA / 74% clay support

[8] 15% PEHA / 13% glycerol / 72% clay support

[9] 20% PEHA / 7% glyerol / 73% clay support

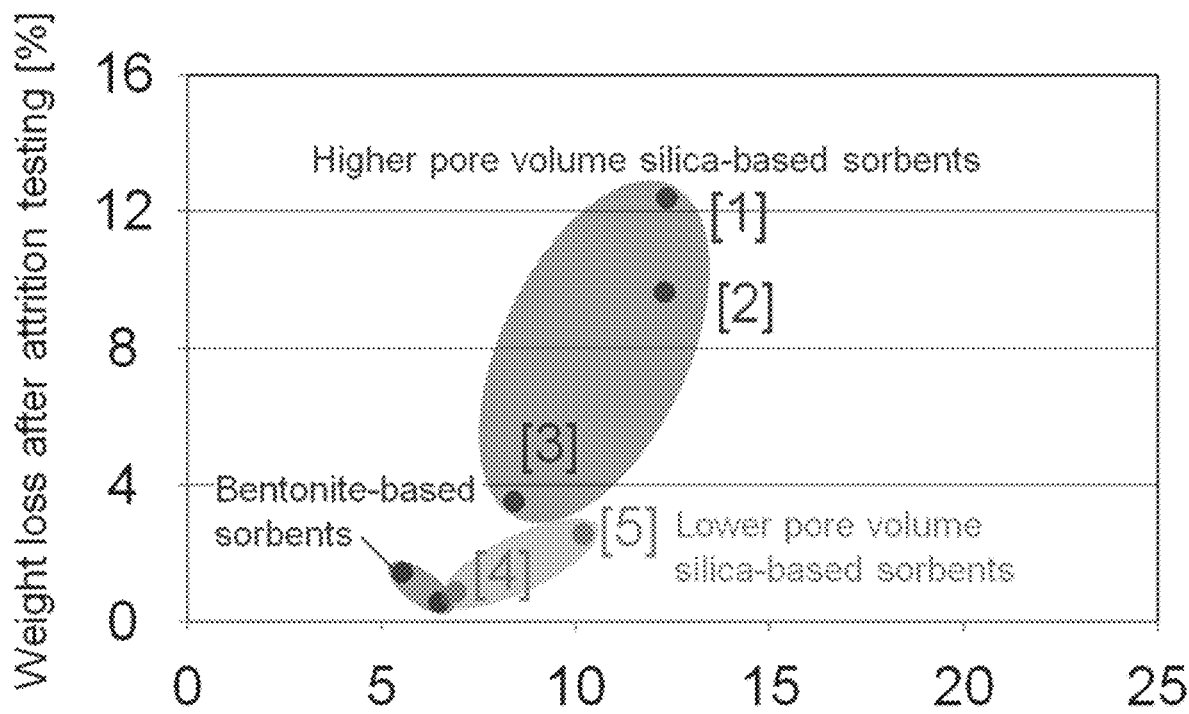

FIG. 8A

| | Support | Amine | CO2 Adsorption Capacity (g-CO2 / L-sorbent) | Weight loss after attrition test (%) |
|---|---|---|---|---|
| [1] | 40% silica powder (-> granule) | 60% DEA | 12.97 | 12.3% |
| [2] | 35 % silica powder 25% clay powder (attapulgite) (-> granule) | 40% DEA | 12.72 | 8.7 |
| | 30% silica powder 30% milled silica powder (-> granule) | 40% DEA | 14.05 | ~ |
| [3] | 35% silica powder 25% clay powder (attapulgite) (-> granule) | 40% DEA | 8.64 | 3.3% |
| [4] | 30% silica powder 30% clay powder (attapulgite) (-> granule) | 40% DEA | 6.38 | 0.9% |
| [5] | 48% silica powder 12% clay powder (bentonite) (-> granule) | 40% DEA | 10.82 | 2.9% |

FIG. 8B

METHODS OR PRODUCING CARBON DIOXIDE SORBENTS FOR INDOOR AIR QUALITY CONTROL

CROSS-REFERENCE TO RELATED APPLICATIONS

This application is a divisional application of U.S. Non-Provisional patent application Ser. No. 15/560,559, filed on Sep. 22, 2017, which is a national stage entry under 35 U.S.C. § 371 of International Application Serial No. PCT/US2016/023727, filed on Mar. 23, 2016, which claims the benefit of priority of U.S. Provisional Patent Application Ser. No. 62/136,918, filed on Mar. 23, 2015, and U.S. Provisional Patent Application Ser. No. 62/250,300, filed on Nov. 3, 2015, the disclosures of which are hereby incorporated by reference herein in their entireties.

BACKGROUND

In commercial buildings, air quality is often maintained by replacing indoor air with outside air to reduce carbon dioxide ($CO_2$) concentrations to safe levels. However, such ventilation serves as a major energy consumption source (up to 50%) in heating, ventilation, and air-conditioning (HVAC) systems.

$CO_2$ sorbent materials have been developed to improve the energy efficiency of HVAC systems. Specifically, HVAC systems have utilized $CO_2$ scrubbers that incorporate $CO_2$ sorbents to adsorb $CO_2$ from recirculated interior air and then release the $CO_2$ into outside air by a purging process. While such systems have improved upon conventional HVAC systems in terms of energy savings, the sorbent materials fail to meet long term targets for working capacity and thermal aging stability.

SUMMARY OF THE DISCLOSURE

The following presents a simplified summary of various aspects of the present disclosure in order to provide a basic understanding of such aspects. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

In one aspect of the present disclosure, a sorbent comprises a gas-adsorbing material comprising an amine compound and a hydroxyl-containing additive. The hydroxyl-containing additive comprises at least one of glycerol, glycerin, pentaerythritol, sorbitol, sucrose, polyether, polyester, ethylene glycol, or a silicon-based compound. The sorbent further comprises a porous support impregnated with the gas-adsorbing material.

In one embodiment, the gas-adsorbing material and the hydroxyl-containing additive are mixed together forming a coating on the porous support. In one embodiment, the hydroxyl-containing additive comprises the silicon-based compound; wherein the silicon-based compound forms a silicon-based coating on the porous support; and wherein the gas-adsorbing material is coated onto the silicon-based coating.

In another aspect of the present disclosure, a sorbent comprises a porous support comprising a silicon-based coating disposed thereon; and a gas-adsorbing material coated onto the silicon-based coating, the gas-adsorbing material comprising an amine compound.

In certain embodiments, the gas-adsorbing material comprises diethanolamine or pentaethylenehexamine, and the hydroxyl-containing additive comprises glycerol.

In certain embodiments, the silicon-based coating is present in an amount ranging from greater than 0% to 20% of a total weight of the porous support and the silicon-based coating, from greater than 0% to 5% of the total weight of the porous support and the silicon-based coating, or from 1% to 3% of the total weight of the porous support and the silicon-based coating.

In certain embodiments, the silicon-based coating was formed by treating the porous support with one or more of tetraethylorthosilicate, colloidal silica, or sodium silicate.

In certain embodiments, the amine compound is present in an amount ranging from 20% to 40% of a total weight of the sorbent, or from 23% to 35% of the total weight of the sorbent.

In certain embodiments, a deactivation factor of the sorbent is greater than 25%, greater than 50%, greater than 75%, greater than 80%, greater than 85%, or greater than 90%.

In certain embodiments, a weight loss of the sorbent after performing an attrition test is less than 3%, and a $CO_2$ adsorption capacity of the sorbent is greater than 6 g/L when the sorbent is maintained at a temperature greater than 20° C. and less than 40° C.

In certain embodiments, a $CO_2$ adsorption capacity of the sorbent remains greater than 60% of an initial $CO_2$ adsorption capacity when the sorbent maintained at a temperature from 40° C. to 60° C. for up to 100 hours.

In certain embodiments, the amine compound comprises molecular species each comprising at least one amine moieties, at least two amine moieties, or at least three amine moieties.

In certain embodiments, the amine compound comprises one or more of diethanolamine, triethylenepentamine, tetraethylenepentamine, pentaethylenehexamine, triethylenetetramine, bis(2-hydroxypropyl)amine, N,N'-bis(2-hydroxyethyl)ethylenediamine, monoethanolamine, diisopropanolamine, alkylamines, methylamine, linear polyethyleneimine, branched polyethyleneimine, dimethylamine, diethylamine, methyldiethanolamine, methylethanolamine, or polyethylene polyamines.

In certain embodiments, the amine compound comprises diethanolamine and pentaethylenehexamine.

In certain embodiments, the amine compound comprises diethanolamine.

In certain embodiments, a $CO_2$ adsorption capacity of the sorbent is greater than 8 g/L when the sorbent is maintained at a temperature greater than 20° C. and less than 40° C. In certain embodiments, the $CO_2$ adsorption capacity of the sorbent is greater than 10 g/L when the sorbent is maintained at a temperature greater than 20° C. and less than 40° C. In certain embodiments, the $CO_2$ adsorption capacity of the sorbent is greater than 15 g/L when the sorbent is maintained at a temperature greater than 20° C. and less than 40° C. In certain embodiments, the $CO_2$ adsorption capacity of the sorbent is greater than 20 g/L when the sorbent is maintained at a temperature greater than 20° C. and less than 40° C.

In certain embodiments, the porous support comprises a clay. In certain embodiments, the porous support comprises one or more of bentonite, attapulgite, kaolinite, montmorillonite, ball clay, fuller's earth, hectorite, palygorskite, saponite, sepiolite, halloysite, silica, calcium sulfate, zeolite, synthetic zeolite, alumina, fumed silica, activated charcoal, or metal organic framework. In certain embodiments, the porous support comprises attapulgite. In certain embodiments, the porous support comprises clay having silica coated thereon.

In certain embodiments, a surface area of the porous support is greater than 50 m$^2$/g prior to impregnation with the gas-adsorbing material. In certain embodiments, the surface area of the porous support is greater than 100 m$^2$/g prior to impregnation with the gas-adsorbing material. In certain embodiments, the surface area of the porous support is greater than 100 m$^2$/g and less than 120 m$^2$/g prior to impregnation with the gas-adsorbing material. In certain embodiments, the surface area of the porous support is greater than 200 m$^2$/g prior to impregnation with the gas-adsorbing material. In certain embodiments, the surface area of the porous support is greater than 200 m$^2$/g and less than 500 m$^2$/g prior to impregnation with the gas-adsorbing material. In certain embodiments, the surface area of the porous support is greater than 200 m$^2$/g and less than 400 m$^2$/g prior to impregnation with the gas-adsorbing material. In certain embodiments, the surface area of the porous support is greater than 200 m$^2$/g and less than 300 m$^2$/g prior to impregnation with the gas-adsorbing material.

In certain embodiments, an average pore volume of the sorbent is greater than 0.2 cc/g and less than 0.8 cc/g. In certain embodiments, the average pore volume of the sorbent is greater than 0.4 cc/g and less than 0.5 cc/g.

In certain embodiments, the sorbent is in a form of granules. In certain embodiments, an average size of the granules ranges from about 0.25 mm to about 5 mm. In certain embodiments, the average size of the granules ranges from about 0.25 mm to about 1.5 mm.

In certain embodiments, the sorbent is in a form of a porous ceramic honeycomb, a metallic honeycomb, or a polymeric foam having the sorbent washcoated thereon.

In certain embodiments, the porous support is in a form of a powder. In certain embodiments, the sorbent is in a form of granules formed from the powder after impregnation with the gas-adsorbing material.

In another aspect of the present disclosure, a method for producing a sorbent (e.g., any of the aforementioned sorbent embodiment) comprises impregnating a porous support with a gas-adsorbing material. The gas-adsorbing material comprises an amine compound and the hydroxyl-containing additive comprises one or more of glycerol, sorbitol, sucrose, polyether, polyester, ethylene glycol, or a silicon-based compound. In one embodiment, the method further comprises calcining the porous support prior to the impregnating. In one embodiment, the method further comprises mixing the gas-adsorbing material with the hydroxyl-containing additive, wherein impregnating the porous support comprises simultaneously impregnating the porous support with the gas-adsorbing material and the hydroxyl-containing additive.

In another aspect of the present disclosure, a method for producing a sorbent comprises forming a silicon-based coating on a porous support to form a coated support; and impregnating the coated support with a gas-adsorbing material, the gas-adsorbing material comprising an amine. In one embodiment, forming the silicon-based coating on the porous support comprises treating the porous support with one or more of tetraethylorthosilicate, colloidal silica, or sodium silicate. In one embodiment, the method further comprises calcining the coated support prior to forming the silicon-based coating or after forming the silicon-based coating.

In certain embodiments, calcining comprises calcining at a temperature from 400° C. and 600° C., or from 540° C. and 580° C.

In another aspect of the present disclosure, a $CO_2$ scrubbing system comprises one or more filtration cartridges arranged to contact a flow of air received into the $CO_2$ scrubbing system; and any embodiments of the aforementioned sorbents disposed within the one or more filtration cartridges.

In another aspect of the present disclosure, a method for treating air comprises flowing a first volume of air into an air treatment chamber comprising any embodiments of the aforementioned sorbents, the first volume of air having a first $CO_2$ concentration; and contacting the sorbent with the first volume of air, wherein a second $CO_2$ concentration of the first volume of air is less than the first $CO_2$ concentration after the contacting. In one embodiment, the first volume of air comprises recirculated air from an interior of a building. In one embodiment, the method further comprises flowing a second volume of air into the air treatment chamber, the second volume of air having a third $CO_2$ concentration; and contacting the sorbent with the second volume of air, wherein a fourth $CO_2$ concentration of the second volume of air is greater than the third $CO_2$ concentration after the contacting. In one embodiment, the second volume of air comprises air from outside of the building.

In another aspect of the present disclosure, an automobile ventilation system includes a filter unit that includes any embodiments of the aforementioned sorbents disposed within the filter unit.

In another aspect of the present disclosure, an air control system for removing carbon dioxide from atmospheric air includes a filter unit that includes any embodiments of the aforementioned sorbents disposed within the filter unit.

As used herein, "deactivation factor" is used as a measure of a sorbent's stability against thermal aging using thermogravimetric analysis. When evaluating a sorbent's $CO_2$ adsorption capacity, deactivation factor corresponds to a ratio of $CO_2$ adsorption capacity after aging the sorbent (conditions: 100° C. for 6 hours in $N_2$ followed by 90° C. for 2 hours in air) to an initial $CO_2$ adsorption capacity. Higher deactivation factor indicates that the sorbent has higher stability against aging. A typical condition for adsorption/desorption of $CO_2$ cycle is as follows: adsorption for 30 min, 1000 ppm $CO_2$ (air balance: 20% $O_2$ and $N_2$ balance), 30° C.; desorption for 30 min, 400 ppm $CO_2$ ($N_2$ balance), 50° C.

As used herein, the term "adsorbent material" refers to a material that can adhere gas molecules, ions, or other species within its structure (e.g., removal of $CO_2$ from air). Specific materials include but are not limited to clays, metal organic framework, activated alumina, silica gel, activated carbon, molecular sieve carbon, zeolites (e.g., molecular sieve zeolites), polymers, and resins. Certain adsorbent materials may preferentially or selectively adhere particular species.

As used herein, the term "adsorption capacity" refers to a working capacity for an amount of a chemical species that an adsorbent material can adsorb under specific operating conditions (e.g., temperature and pressure). The units of adsorption capacity, when given in units of g/L, correspond to grams of adsorbed gas per liter of sorbent.

Also as used herein, the term "activation" refers to the treatment of adsorption materials (e.g., $CO_2$ sorbent particles) in a manner to increase their storage capacity. Typically, the treatment results in removal of contaminants (e.g., water, non-aqueous solvent, sulfur compounds and higher hydrocarbons) from adsorption sites in order to increase the capacity of the materials for their intended purpose.

Also as used herein, the term "particles", as used herein, refers to a collection of discrete portions of a material each having a largest dimension ranging from 0.1 μm to 50 mm. The morphology of particles may be crystalline, semi-crystalline, or amorphous. The term "particle" may also encompass powders down to 1 nm in radius. The size ranges disclosed herein can be mean/average or median size, unless otherwise stated. It is noted also that particles need not be spherical, but may be in a form of cubes, cylinders, discs, or any other suitable shape as would be appreciated by one of ordinary skill in the art. A "granule" may be a type of particle.

Also as used herein, the term "monolith" when referring to absorbent materials refers to a single block of the material. The single block can be in the form of, e.g., a brick, a disk or a rod and can contain channels for increased gas flow/distribution. In certain embodiments, multiple monoliths can be arranged together to form a desired shape.

Also as used herein, the term "amine compound" refers to one or more molecular species each having at least one primary, secondary, or tertiary amine. Also as used herein, the term "polyamine", refers to one or more molecular species each having at least two amines selected from primary, secondary, and tertiary amines. Types of polyamines include diamines, triamines, tetraamines, etc.

Also as used herein, the term "silicon-based coating" refers to a coating layer that comprises silicon, such as silica, colloidal silica, or sodium silicate.

Also as used herein, the term "about," as used in connection with a measured quantity, refers to the normal variations in that measured quantity, as expected by the skilled artisan making the measurement and exercising a level of care commensurate with the objective of measurement and the precision of the measuring equipment.

BRIEF DESCRIPTION OF THE DRAWINGS

The present disclosure is illustrated by way of example, and not by way of limitation, in the figures of the accompanying drawings, in which:

FIG. 8A illustrates attrition resistance of various sorbents;

FIG. 8B is a table showing parameters of various sorbents used in attrition tests.

DETAILED DESCRIPTION

The embodiments described herein relate to carbon dioxide ($CO_2$) sorbents for heating, ventilation, and air-conditioning (HVAC) systems, and in particular to sorbents with improved adsorption capacity and durability to reduce energy consumption in commercial office buildings. Utilizing a solid $CO_2$ sorbent in a $CO_2$ scrubber unit of an HVAC system allows for a decrease in frequency of ventilation to reduce indoor $CO_2$ concentration level by dilution with outside air, thus reducing energy consumption.

Certain embodiments of the present disclosure relate to $CO_2$ sorbents which have high $CO_2$ adsorption capacity, high stability against repeated usage (thermal/aging stability), and high attrition resistance. The adsorption of $CO_2$ occurs at typical indoor air condition (e.g., between 25° C. and 30° C. at 1000 ppm $CO_2$), and the desorption occurs at typical outdoor air condition in hot climate area such as Texas (e.g., between 45° C. and 50° C. at 400 ppm $CO_2$). An illustrative sorbent includes an amine compound that acts as active gas-adsorbing components and a porous support that serve as a high surface area support for the amine compound. In some embodiments, sorbents contain polyamines that provide high adsorption efficiency, as well as porous materials with high pore volume and surface area for amine loading and high bulk density for attrition resistance. The polyamines allow the sorbent to be regenerated at higher temperatures, for example, up to 80° C.

In some embodiments, granules are used due to less pressure drop and ease of handling when incorporated into an air filtration system. In some embodiments, sorbents utilize high porosity silica powder and/or clay powder, which are extruded to form extrudates. Silica powder tends to provide a high porosity to the extrudates, and clay powder tends to provide high attrition resistance to the extrudates. Such embodiments have exhibited $CO_2$ adsorption capacity that is at least twice as great previous sorbents.

Certain embodiments of the present disclosure relate to a sorbent that includes diethanolamine (DEA) on an attapulgite-based support. In certain embodiments, the attapulgite-based support may include greater than 70 wt % attapulgite by weight, with silica, calcium, and bentonite impurities, as well as volatile matter impurities. It was found that, in certain embodiments, DEA impregnated onto an attapulgite-based support coated with a silicon-based coating demonstrated higher stability against aging at 50° C. and multiple adsorption/regeneration cycle testing than DEA impregnated onto an attapulgite-based support directly without a silicon-based coating.

Figure 1:
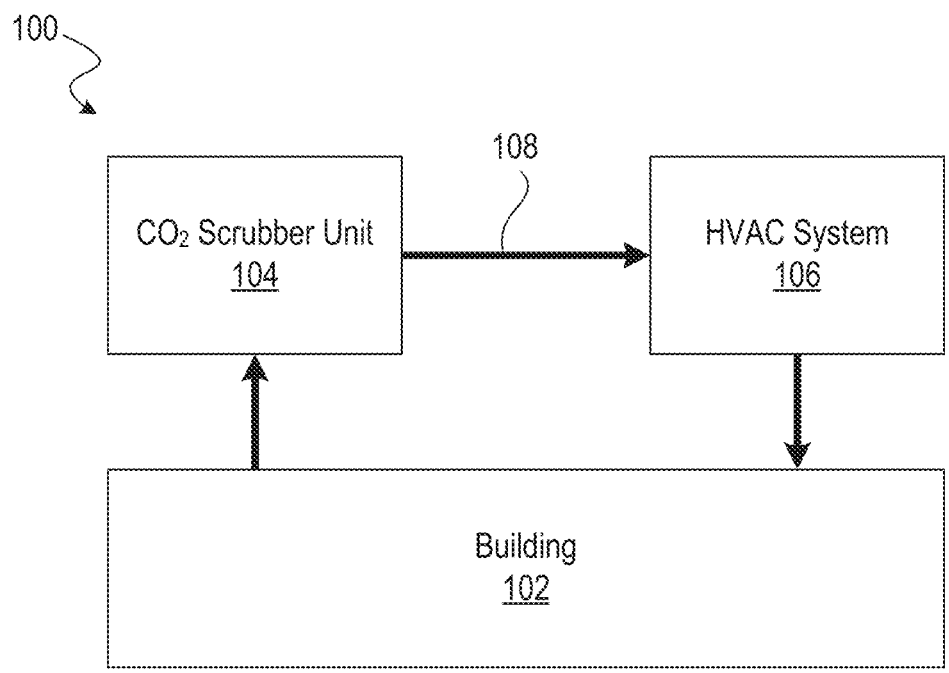
FIG. 1 depicts an illustrative air-flow system in accordance with an embodiment of the disclosure.
Figure 2:
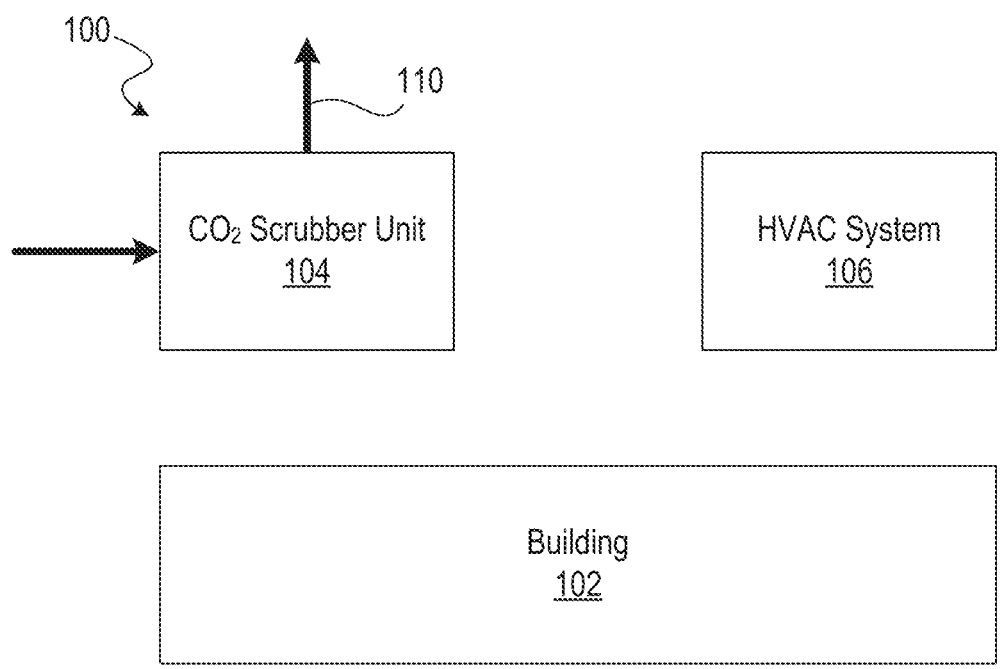
FIG. 2 depicts an illustrative air-flow system in accordance with another embodiment of the disclosure.

FIGS. 1-2 depict an illustrative air-flow system 100 in accordance with an embodiment of the disclosure. The system 100 includes a $CO_2$ scrubber unit 104 and an HVAC system 106 installed as part of a building 102. As shown in FIG. 1, the $CO_2$ scrubber unit 104 and the HVAC system 106 are fluidly coupled to each other and to the interior air space of the building 102 such that a recirculation air flow path 108 is established. As $CO_2$ accumulates within the interior air space of the building 102, interior air is recirculated through the $CO_2$ scrubber unit 104 to adsorb the excess $CO_2$ using a $CO_2$ sorbent. Treated air then passes through the HVAC system 106, which is further filtered (e.g., to remove dust and other particulates) and may be heated or cooled before being recirculated back into the building 102.

As shown in FIG. 2, the $CO_2$ scrubber unit 104 may utilize a purging process to purge adsorbed $CO_2$ from the $CO_2$ sorbent. In certain embodiments, a purging air flow path 110 is established to draw in external (outside) air having a low $CO_2$ concentration. The $CO_2$ scrubber may apply heat (e.g., using a heating element) to the $CO_2$ sorbent to promote desorption of the adsorbed $CO_2$ into the purging air flow path 110 and to the external environment. In some embodiments, the $CO_2$ scrubber may utilize hot external air (e.g., 40° C. to 50° C. air) alone or in combination with applying heat to the $CO_2$ sorbent. In some embodiments, only one of air flow paths 108 and 110 are established at any given time. In some embodiments, the purge process may occur while recirculated air is still flowing. For example, the $CO_2$ scrubber unit 104 may divert recirculated air received from the building 102 such that it flows into the HVAC system 106 without contacting the sorbent, while the purging air flow path 110 is used to regenerate the sorbent (e.g., $CO_2$ desorption). In some embodiments, the $CO_2$ scrubber unit 104 may include multiple sorbents and may define multiple air flow paths. For example, the $CO_2$ scrubber unit 104 may treat $CO_2$ of recirculated air by a first sorbent, while simultaneously regenerating a second sorbent that is isolated from the recirculated air. Once the second sorbent is regenerated, it may be placed in contact with the recirculated air along with the first sorbent. The first sorbent may later be isolated from the recirculated air to be regenerated by the purging process.

The $CO_2$ sorbent may be in the form of granules, such as spherical pellets, cubic pellets, disks, extrudates, beads, powders, or any other suitable shape. In some embodiments, an average size of the granules ranges from about 0.25 mm to about 5 mm. In some embodiments, the average size ranges from 0.25 mm to 1.5 mm. In some embodiments, the average size ranges from 0.25 mm to 2.4 mm. In some embodiments, other sizes may be utilized. In some embodiments, the granules may be loaded into cartridges, which may be subsequently loaded/stacked within a $CO_2$ scrubber unit. In some embodiments, the sorbent may be in a form of porous ceramic honeycomb, metallic honeycomb, or polymeric foam having a sorbent washcoated thereon (e.g., a washcoat of a polyamine impregnated powder, such as a silica powder).

Figure 3:
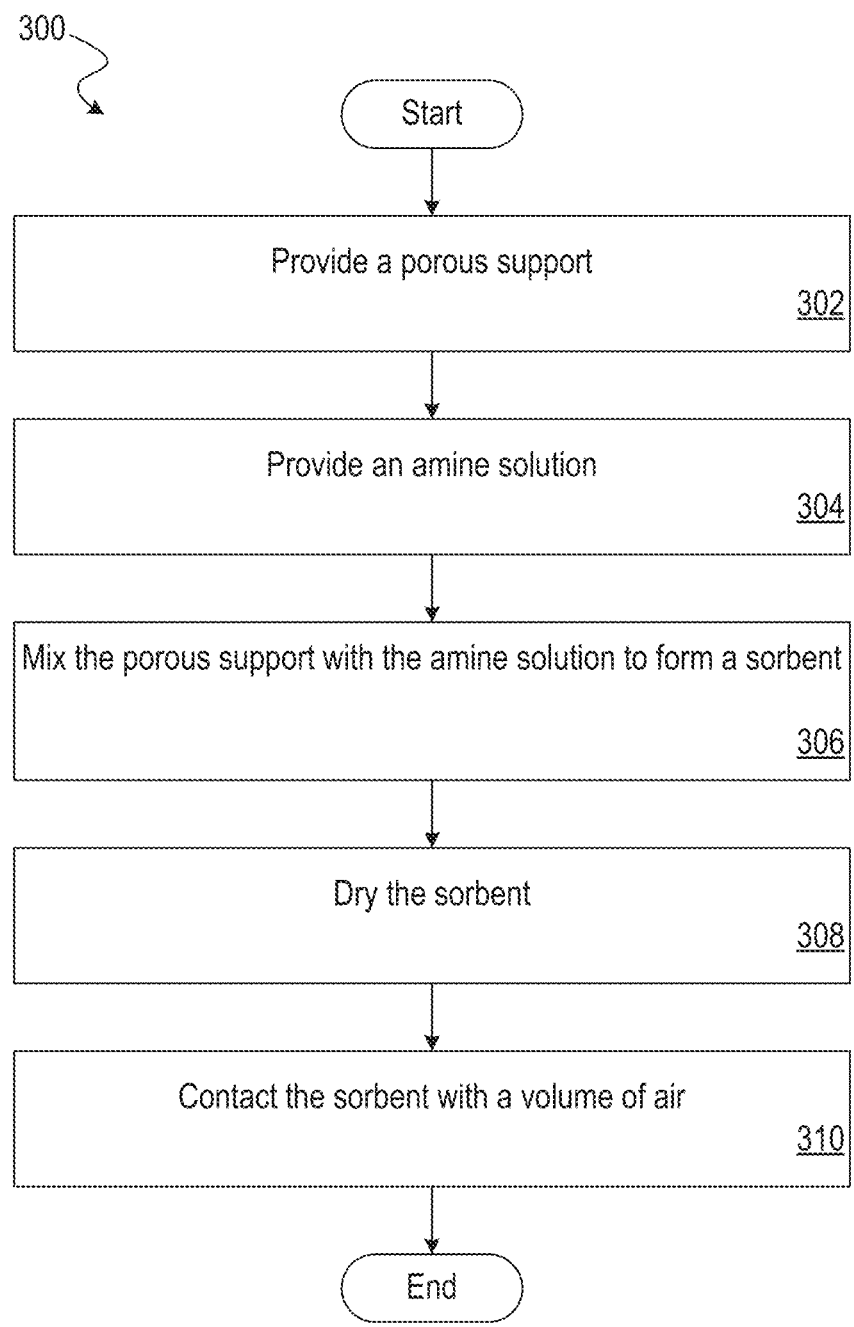
FIG. 3 is a flow diagram illustrating a method for producing a $CO_2$ sorbent in accordance with an embodiment of the disclosure.

FIG. 3 is a flow diagram illustrating a method 300 for producing a $CO_2$ sorbent in accordance with an embodiment of the disclosure. FIG. 3 begins at block 302, where a porous support (e.g., a plurality of porous particles) is provided. The porous support may serve as a high surface area porous support for impregnation with a gas-adsorbing material, such as an amine compound. In certain embodiments, the porous support include clay particles (e.g., bentonite, attapulgite, kaolinite, montmorillonite, ball clay, fuller's earth, hectorite, palygorskite, saponite, sepiolite, halloysite, other clay materials, or combinations thereof). In certain embodiments, the porous support includes silica, calcium sulfate, zeolite, synthetic zeolite, alumina, titania, fumed silica, activated charcoal, metal organic framework, other types of porous materials, or combinations thereof.

In certain embodiments, the porous support includes a plurality of porous particles, such as granules. In certain embodiments, an average size of the particles/granules ranges from about 0.25 mm to about 5 mm. In certain embodiments, the average size ranges from about 0.25 mm to about 1.5 mm. In certain embodiments, the average size ranges from about 0.25 mm to about 2.4 mm.

In certain embodiments, the porous support includes a plurality of porous particles in a powder form. In certain embodiments, an average size of the particles/powder ranges from about 1.0 μm to about 100 μm. In certain embodiments, the average size ranges from about 5.0 μm to about 50 μm.

The surface area of the porous support may be determined by the Brunauer-Emmett-Teller (BET) method according to DIN ISO 9277:2003-05 (which is a revised version of DIN 66131). The specific surface area is determined by a multi-point BET measurement in the relative pressure range from 0.05-0.3 $p/p_0$.

In certain embodiments, a surface area (e.g., BET surface area) of the porous support is greater than 27 $m^2/g$ prior to impregnation with the gas-adsorbing material. In certain embodiments, the porous support includes a plurality of porous particles in a powder form. In certain embodiments, an average size of the particles/powder ranges from about 1.0 μm to about 100 μm. In certain embodiments, the average size ranges from about 5.0 μm to about 50 μm. In certain embodiments, the surface area is greater than 75 $m^2/g$ and less than 300 $m^2/g$. In certain embodiments, the surface area is greater than 100 $m^2/g$ and less than 120 $m^2/g$. In certain embodiments, the surface area is greater than 200 $m^2/g$. In certain embodiments, the surface area is greater than 200 $m^2/g$ and less than 500 $m^2/g$. In certain embodiments, the surface area is greater than 200 $m^2/g$ and less than 400 $m^2/g$. In certain embodiments, the surface area is greater than 200 $m^2/g$ and less than 300 $m^2/g$ prior. In certain embodiments, in which a silicon-based coating is applied to the porous support, a surface area of the porous support increases by at least 5%, at least 10%, at least 20%, at least 30%, from 5% to 40%, from 10% to 40%, or from 20% to 40%.

In certain embodiments, an average pore volume (e.g., Barrett-Joyner-Halenda pore volume) of the porous support is greater than 0.2 mL/g and less than 0.8 mL/g. In certain embodiments, the average pore volume is greater than 0.4 mL/g and less than 0.5 mL/g. In certain embodiments, the average pore volume is greater than 0.1 mL/g and less than 3.0 mL/g. In certain embodiments, the average pore volume is greater than 0.2 mL/g and less than 2.0 mL/g. In certain embodiments, in which a silicon-based coating is applied to the porous support, an average pore volume of the porous support decreases by at most 7%, at most 10%, at most 15%, at most 20%, at most 25%, 5% to 10%, 5% to 20%, or 5% to 25%.

In certain embodiments, an average pore radius (e.g., BET pore radius) of the porous support is greater than 80 angstroms and less than 120 angstroms. In certain embodiments, the average pore radius is greater than 90 angstroms and less than 110 angstroms. In certain embodiments, the average pore radius is greater than 85 angstroms and less than 95 angstroms. In certain embodiments, the average pore radius is greater than 10 angstroms and less than 300 angstroms. In certain embodiments, the average pore radius is greater than 15 angstroms and less than 250 angstroms. In certain embodiments, the average pore radius is greater than 20 angstroms and less than 200 angstroms. In certain embodiments, in which a silicon-based coating is applied to the porous support, an average pore volume of the porous support decreases by at most 10%, at most 15%, at most 20%, 10% to 30%, 15% to 25%, 10% to 20%, or 20% to 30%.

In order to increase capacity of the porous support utilized in the embodiments of the present disclosure, the porous support can be activated. The activation may include subjecting the porous support (e.g., particles) to various conditions including, but not limited to, ambient temperature, vacuum, an inert gas flow, or any combination thereof, for a sufficient time to activate the porous support. In some embodiments, the porous support may be activated by calcining. In certain embodiments, activation may be performed before coating the porous support with a silicon-based coating, after coating the porous support with the silicon-based coating, and/or after impregnation with an amine compound.

In certain embodiments, the activation includes the removal of water molecules from the adsorption sites. In other embodiments, the activation includes the removal of non-aqueous solvent molecules from the adsorption sites that are residual from the manufacture of the porous support. In still further embodiments, the activation includes the removal of sulfur compounds or higher hydrocarbons from the adsorption sites. In embodiments utilizing an inert gas purge in the activation process, a subsequent solvent recovery step is also contemplated. In certain embodiments, the contaminants (e.g., water, non-aqueous solvents, sulfur compounds or higher hydrocarbons) are removed from the porous support at a molecular level.

In certain embodiments, the porous support is calcined prior to impregnation with the gas-adsorbing material. Calcining may be performed at a temperature between 400° C. and 600° C. in certain embodiments, between 540° C. and 580° C. in other embodiments, or between 100° C. and 150° C. in other embodiments.

In some embodiments, the hydroxyl-containing additive may be a silicon-based compound. In such embodiments, the silicon-based coating may form a silicon-based coating on the porous support. In some embodiments, the coated support may be calcined before or after forming the silicon-based coating. Embodiments of coated supports are described further with respect to FIG. 4.

At block 304, an amine solution is provided. The amine solution may contain an amine compound (e.g., one or more types. Amine compounds may include organic molecular species having one or more primary amines, one or more secondary amines, and one or more tertiary amines. For example, a solution having a first amine species (e.g., DEA) and a second amine species (e.g., PEHA) may include the first amine species at a first concentration and the second amine species at a second concentration. In certain embodiments, the amine solution contains DEA without any other types of amine species.

Examples of amine species are shown below:
Diethanolamine (DEA)
M: 105.14 g/mol
Boiling point: 269.9° C.

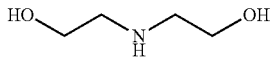

Triethylenepentamine (TEPA

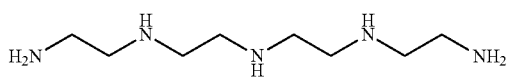

M: 189.30 g/mol
Boiling point: 340° C.
Pentaethylenehexamine (PEHA)
M: 232.37 g/mol
Boiling point: 380° C.

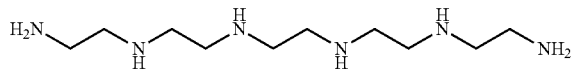 [SMILES: NCCNCCNCCNCCNCCN]

Other amine species include, but are not limited to, triethylenetetramine, tetraethylenepentamine, bis(2-hydroxypropyl)amine, N,N'-bis(2-hydroxyethyl)ethylenediamine, monoethanolamine, diisopropanolamine, alkylamines, methylamine, polyethyleneimine (branched or linear), dimethylamine, diethylamine, methyldiethanolamine, methylethanolamine, and polyethylene polyamines.

In certain embodiments, specific compositions of amine compounds may include Heavy Polyamine X (Dow), ethyleneamine E-100 (Huntsman), HEPA and HEPAS140 (Delamine), or combinations thereof.

In certain embodiments, one or more hydroxyl-containing additives to increase amine gas-adsorbing efficiency and aging tolerance. In certain embodiments, the one or more hydroxyl-containing additives may include one or more alcohols (e.g., glycerol). In certain embodiments, the one or more hydroxyl-containing additives may include one or more of glycerol, sorbitol, or sucrose.

At block 306, the porous support is mixed with the amine solution to form a sorbent. The porous support may become impregnated with the amine compound (e.g., via incipient wetness impregnation). The impregnation may occur under various conditions including, but not limited to, ambient temperature, varying atmospheric conditions (e.g., under air, under nitrogen atmosphere, under vacuum, or under low pressure nitrogen atmosphere), an inert gas flow, or any combination thereof.

At block 308, the sorbent is dried. At block 310, the sorbent is contacted with a volume of air, and is adapted to adsorb a gas from the volume of air. In some embodiments, the gas is $CO_2$. In some embodiments, other gases may be adsorbed (e.g., volatile organic compounds) in addition to or in lieu of $CO_2$.

In certain embodiments, after drying, a weight percent of the amine compound (e.g., diethanolamine) impregnated onto the porous support ranges from 20% to 60% of a total weight of the sorbent, from 20% and 40% of a total weight of the sorbent, from 30% and 50% of the total weight of the sorbent, from 27% and 37% of the total weight of the sorbent, from 38% and 45% of the total weight of the sorbent, or from 30% to 32% of the total weight of the sorbent. In certain embodiments, a weight percent of organic content (including the amine compound and other additives) ranges from 20% to 60% weight percent of a total weight of the sorbent, from 30% to 50% weight percent of a total weight of the sorbent, from 38% to 45% weight percent of a total weight of the sorbent, or from 23% to 35% weight percent of a total weight of the sorbent. A weight percent of the porous support (e.g., coated or uncoated support) ranges from 40% to 80% weight percent of the total weight of the sorbent, from 50% to 70% weight percent of the total weight of the sorbent, from 55% to 62% weight percent of the total weight of the sorbent, or from 65% to 77% weight percent of the total weight of the sorbent.

In some embodiments, a $CO_2$ adsorption capacity of the sorbent is greater than 8 g/L when the sorbent is maintained at a temperature greater than 20° C. and less than 40° C. (adsorption of $CO_2$), and then the sorbent is maintained at a temperature greater than 40° C. and less than 55° C. (desorption of $CO_2$). In some embodiments, a $CO_2$ adsorption capacity of the sorbent is greater than 10 g/L when the sorbent is maintained at a temperature greater than 20° C. and less than 40° C. (adsorption of $CO_2$), and then the sorbent is maintained at a temperature greater than 40° C. and less than 55° C. (desorption of $CO_2$). In some embodiments, a $CO_2$ adsorption capacity of the sorbent is greater than 15 g/L when the sorbent is maintained at a temperature greater than 20° C. and less than 40° C. (adsorption of $CO_2$), and then the sorbent is maintained at a temperature greater than 40° C. and less than 55° C. (desorption of $CO_2$). In some embodiments, a $CO_2$ adsorption capacity of the sorbent is greater than 20 g/L when the sorbent is maintained at a temperature greater than 20° C. and less than 40° C. (adsorption of $CO_2$), and then the sorbent is maintained at a temperature greater than 40° C. and less than 55° C. (desorption of $CO_2$).

In some embodiments, a deactivation factor of the sorbent is greater than 25%, or greater than 50%. In some embodiments, the $CO_2$ adsorption capacity of the sorbent is greater than 8 g/L when the sorbent is maintained at a temperature greater than 20° C. and less than 40° C., with the deactivation factor of the sorbent being greater than 25%. In one embodiment, the $CO_2$ adsorption capacity of the sorbent is greater than 14 g/L when the sorbent is maintained at a temperature greater than 20° C. and less than 40° C., with the deactivation factor of the sorbent being greater than 25%. In one embodiment, the $CO_2$ adsorption capacity of the sorbent is greater than 8 g/L when the sorbent is maintained at a temperature greater than 20° C. and less than 40° C., with the deactivation factor of the sorbent being greater than 50%. In one embodiment, the $CO_2$ adsorption capacity of the sorbent is greater than 14 g/L when the sorbent is maintained at a temperature greater than 20° C. and less than 40° C., with the deactivation factor of the sorbent being greater than 50%.

In some embodiments, a $CO_2$ adsorption capacity of the sorbent is greater than 1.5 wt %, greater than 1.6 wt %, greater than 1.7 wt %, greater than 1.8 wt %, greater than 1.9 wt %, greater than 2.0 wt %, greater than 2.1 wt %, greater than 2.2 wt %, greater than 2.3 wt %, greater than 2.4 wt %, or greater than 2.5 wt % when computed as a weight of adsorbed $CO_2$ versus a weight of the sorbent.

In one embodiment, a weight loss of the sorbent after performing an attrition test is less than 3%, and a $CO_2$ adsorption capacity of the sorbent is greater than 10 g/L when the sorbent is maintained at a temperature greater than 20° C. and less than 40° C. In one embodiment, the weight loss of the sorbent after performing the attrition test is less than 1.5%.

In some embodiments, a reduction of adsorption capacity from a fresh sorbent adsorption capacity to an aged adsorption capacity from aging under ambient air at 50° C. for 100 hours is less than 40%, is less than 30%, is less than 20%, or is less than 10%.

Figure 4:
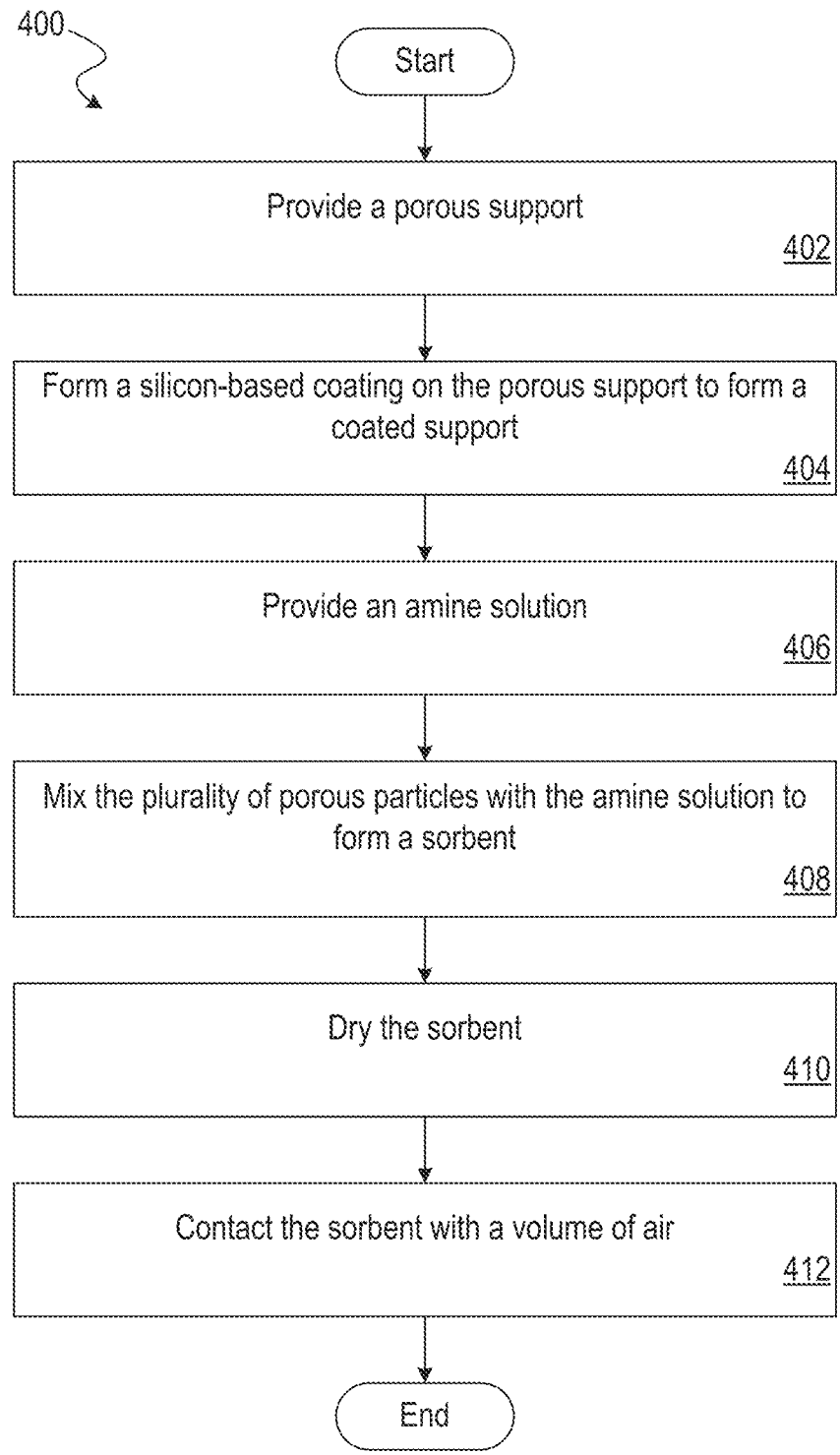
FIG. 4 is a flow diagram illustrating another method for producing a $CO_2$ sorbent in accordance with an embodiment of the disclosure.

FIG. 4 is a flow diagram illustrating a method 400 for producing a $CO_2$ sorbent in accordance with an embodiment of the disclosure. FIG. 4 begins at block 402, where a porous support (e.g., a plurality of porous particles) is provided. The porous support may be similar to that described with respect to FIG. 3.

At block 404, a silicon-based coating is formed on the porous support to form a coated support (e.g., a silica-coated support). In certain embodiments, the porous support is treated with an aqueous solution containing tetraethylorthosilicate (TEOS). In certain embodiments, the porous support is incubated with the TEOS at a temperature from 50° C. to 70° C. (e.g., 60° C.) for 1 hour to 3 hours. In other embodiments, the porous support may be treated with other materials, such as colloidal silica or sodium silicate. The silicon-based coating may be formed under various conditions including, but not limited to, ambient temperature, vacuum, an inert gas flow, or any combination thereof.

In certain embodiments, the coated support is calcined prior to impregnation with the gas-adsorbing material (e.g., before and/or after forming the silicon-based coating). Calcining may be performed at a temperature between 400° C. and 600° C. in certain embodiments, between 540° C. and 580° C. in other embodiments, or between 100° C. and 150° C. in other embodiments.

At block 406, an amine solution is provided. The amine solution may be similar to that described with respect to FIG. 3.

At block 408, the coated support is mixed with the amine solution to form a sorbent. At block 410, the sorbent is dried. At block 412, the sorbent is contacted with a volume of air, and is adapted to adsorb a gas from the volume of air. Blocks 408, 410, and 412 may be performed similar to blocks 306, 308, and 310, respectively, as described with respect to block 306 of FIG. 3. The properties of the resulting sorbent may be the same as or similar to those described with respect to the resulting sorbent of FIG. 3.

It is noted that the blocks of methods 300 and 400 are not limiting, and that, in some embodiments, some or all of the blocks may be performed. In some embodiments, one or more of the blocks may be performed substantially simultaneously. Some blocks may be omitted entirely or repeated. For example, blocks 310 and 412 may be omitted or performed separately from the remaining blocks.

The following examples are set forth to assist in understanding the disclosed embodiments and should not, of course, be construed as specifically limiting the embodiments described and claimed herein. Such variations of the embodiments, including the substitution of all equivalents now known or later developed, which would be within the purview of those skilled in the art, and changes in formulation or minor changes in experimental design, are to be considered to fall within the scope of the embodiments incorporated herein.

Illustrative Examples of General Embodiments

Calcined clay granules were used in the following examples of this section as a porous support. The clay granules included at least 70 wt % attapulgite, and included silica, calcium, and bentonite as impurities. An average size of the granules ranged from about 0.25 mm to about 1.5 mm. A BET average surface area of the granules ranged from 90 $m^2/g$ to 120 $m^2/g$. A BJH average pore volume of the granules ranged from 0.42 cc/g to 0.5 cc/g. A BET average pore radius ranged from 85 angstroms to 100 angstroms. The calcined clay granules are referred to below as "clay support", and the clay supports used in the following examples are all attapulgite-based granules.

Example A1. DEA-Impregnated Sorbent

A sorbent was prepared by wet impregnation of diethanolamine (DEA) onto a clay support. Prior to impregnation, the clay support was calcined at 560° C. for 2 hours. DEA was dissolved by being heated at 60° C. for approximately 2 hours. DEA (20 g) was added to 6.7 g of distilled water to produce a DEA solution. The clay support (41.4 g) and the DEA solution were heated at 60° C. for 15 minutes, and the DEA solution was poured into the clay support while stirring vigorously for 5 minutes, resulting in a DEA-impregnated sorbent. The DEA-impregnated sorbent was dried at 60° C. for 2 hours. The initial $CO_2$ adsorption capacity and DF of the sorbent were 12.42 g/L and 48%, respectively. In some embodiments, the porous support was pre-treated with acid prior to impregnation.

Example A2: Mixed-Amine-Impregnated Sorbent

A sorbent was prepared by wet impregnation of DEA, pentaethylenehexamine (PEHA), and glycerol onto a clay support. Prior to impregnation, the clay support was calcined at 560° C. for 2 hours. DEA was dissolved by being heated at 60° C. for approximately 2 hours. DEA (5.36 g), PEHA (5.8 g), and glycerol (1.53 g) were added to 8.11 g of distilled water to produce a mixed-amine solution. The calcined clay support (41.4 g) and the mixed-amine solution were heated at 60° C. for 15 minutes, and the mixed-amine solution was poured into the clay support while stirring vigorously for 5 minutes, resulting in an amine-impregnated sorbent. The DEA-impregnated sorbent was dried at 60° C. for 2 hours. The initial $CO_2$ adsorption capacity and DF of the sorbent were 13.27 g/L and 26%, respectively.

Example A3: Adsorption Capacity Measurements $CO_2$ adsorption capacity was measured by placing sorbent particles in a packed bed reactor. Adsorption was measured over 60 minutes at 25° C. for an air flow of 0.1 m/second with a $CO_2$ concentration of 1000 ppm with 0% water by volume (to simulate building interior air conditions). Desorption was measured over 30 minutes at 50° C. for an air flow of 0.2 m/s with a $CO_2$ concentration of 400 ppm with 1% water (to simulate outdoor air conditions).

Figure 5:
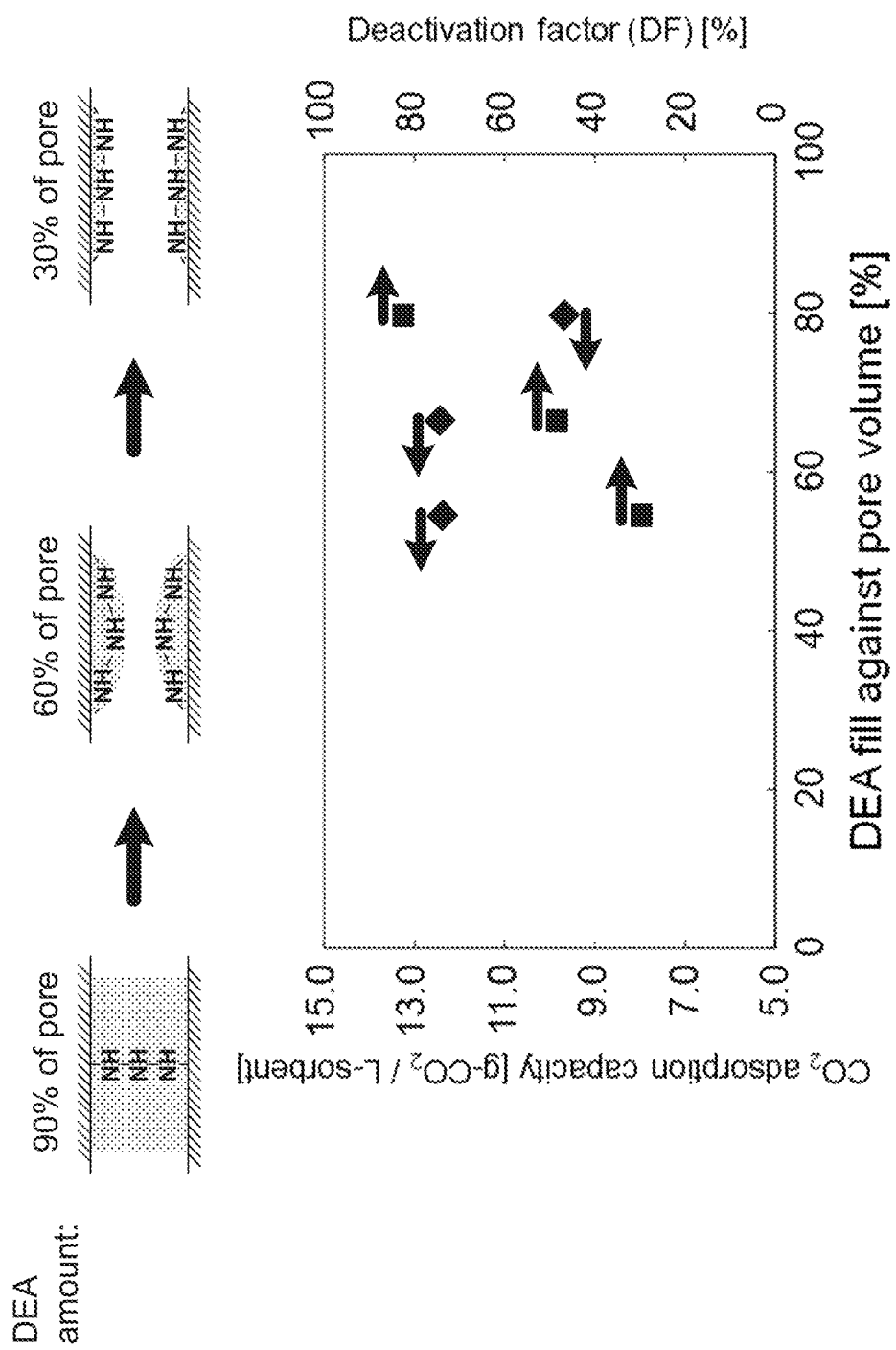
FIG. 5 illustrates the effects of the amount of amine compound on $CO_2$ adsorption capacity and deactivation factor.

FIG. 5 illustrates the effects of DEA amount (in terms of average pore volume) on $CO_2$ adsorption capacity, which shows a decrease in $CO_2$ adsorption capacity with increasing DEA amount. As illustrated schematically in FIG. 5, this effect is likely due to overloading of DEA, which may clog pores and reduce the overall gas-accessible surface area of the sorbent.

Example A4: Thermal Aging Analysis

Stability against thermal aging of sorbents was evaluated by measuring a deactivation factor for each sorbent. Deactivation factor is a ratio of adsorption capacity of aged sorbent versus adsorption capacity of fresh sorbent. Sorbents were subjected to an accelerated thermal/oxidation exposure process in which the sorbents were cycled 5 times between 1000 ppm $CO_2$ at 30° C. in air for 30 minutes and $N_2$ at 50° C. for 30 minutes, followed by an aging process in which the sorbents were exposed to $N_2$ for 6 hours at 100° C. followed by air for 2 hours at 90° C. After the aging process, the sorbents were cycled an additional 5 times in order to compare adsorption capacities before and after aging in a single experiment.

FIG. 5 further illustrates the effects of DEA amount (in terms of average pore volume) on deactivation factor, which shows an increase in deactivation factor with increasing DEA amount. Increased amounts of DEA likely reduce aging effects that may result from DEA loss during the lifetime of the sorbent.

Figure 6:
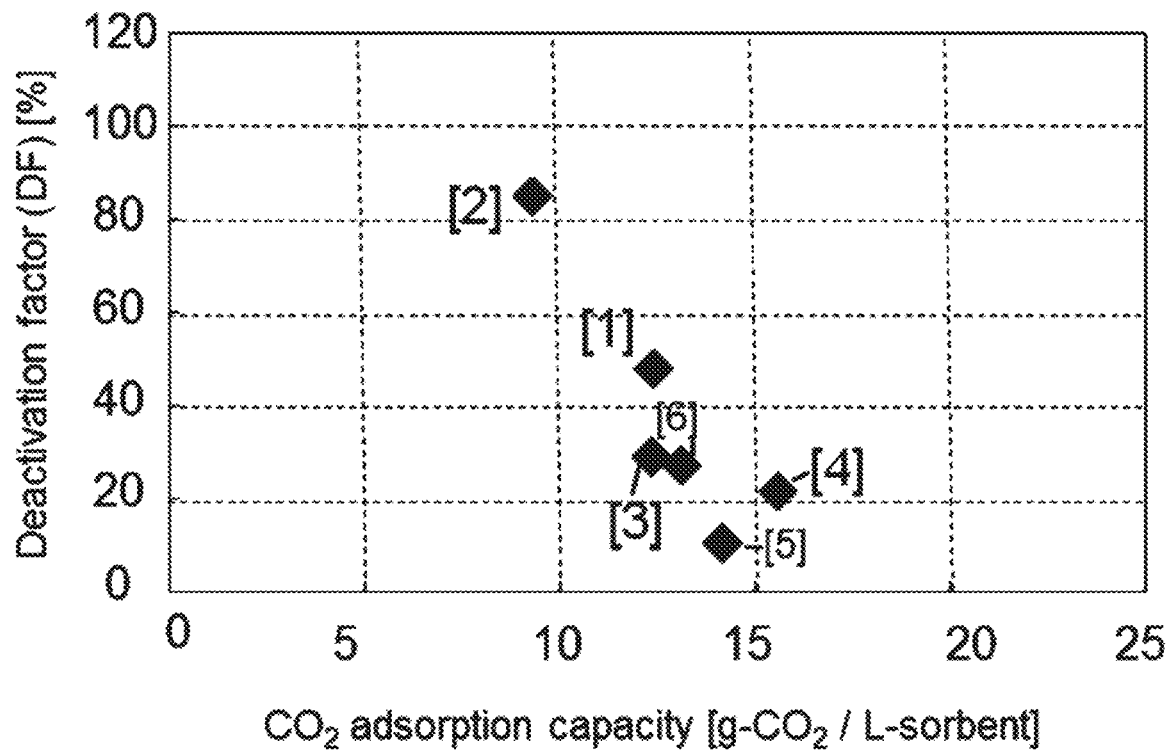
FIG. 6 illustrates $CO_2$ adsorption capacity versus deactivation factor for various sorbents.
Figure 7:
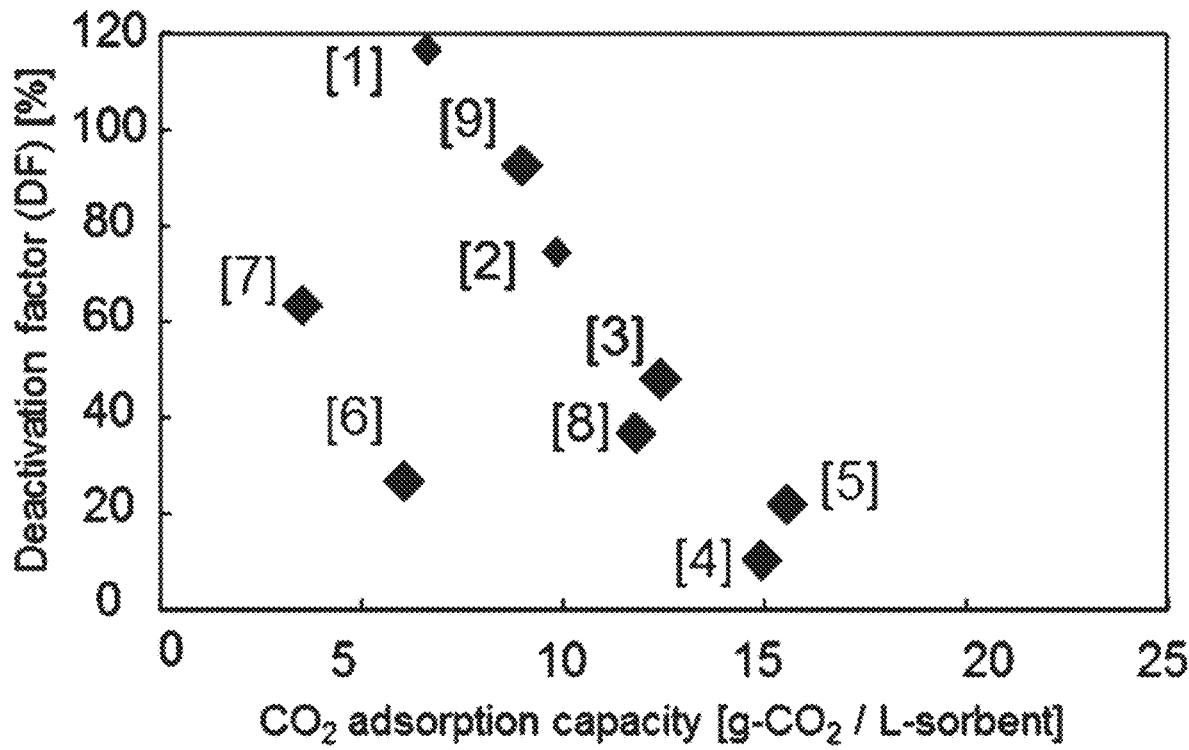
FIG. 7 illustrates $CO_2$ adsorption capacity versus deactivation factor for various sorbents.

FIG. 6 illustrates $CO_2$ adsorption capacity versus deactivation factor for various sorbents, which indicate that incorporating a hydroxyl-containing additive (e.g., glycerol) can improve aging stability. FIG. 7 illustrates $CO_2$ adsorption capacity versus deactivation factor for various sorbents incorporating different compositions (e.g., porous supports, amine compounds, glycerol present or absent).

Example A5: Attrition Tests

Attrition tests were performed using a 5-penny attrition test, in which sorbent particles were mechanically vibrated with 5 pennies for 15 minutes, and then sieved with a 250 micrometer filter. The weight loss was computed as the difference between the initial weight prior to the test and the final sieved weight.

FIG. 8A is a plot illustrating attrition resistance of various $CO_2$ sorbents, and FIG. 8B is a table showing details of the sorbent compositions. Weight loss after attrition testing was lower (e.g., less than 3%) for granules made out of higher pore volume silica powder than that for granules made out of lower pore volume silica powder. Typically, the silica powders used in FIGS. 8A and 8B had a BET surface areas of 100-200 $m^2$/g and BJH pore volumes of 0.2-1.2 cc/g. The granules made out of clay powder tended to have higher attrition resistance than granules made out of silica powder alone.

Illustrative Examples of Coated Supports

The same clay support described in the preceding examples was used in the following examples.

Example B1: TEOS Treatment

A hydrolysis reaction was initiated by mixing a clay support with an aqueous solution containing TEOS (2-20 wt %) and incubating at 60° C. for 2 hours, resulting in a silica-coated support.

In other batches, TEOS was added to the clay support in amounts from 2-20 wt % of the mixture (98-80 wt % of mixture corresponding to clay support), followed by stirring with a spatula for 5 minutes at room temperature and heating to 60° C. for 2 hours.

Example B2: Treatment with Colloidal Silica

Colloidal silica (5 wt %) was added to water to prepare a colloidal silica solution in which a total amount of liquid was the same as a total liquid holding capacity (or incipient wetness point) of clay support. The colloidal silica solution was added to the clay support, and the mixture was stirred with a spatula for 2-3 minutes at room temperature. The mixture was then heated to 100° C. or 120° C. for 1 or 3 hours, respectively.

Example B3: Treatment with Sodium Silicate

Sodium silicate (2.6-5.0 wt %) was added to water to prepare a sodium silicate solution in which a total amount of liquid was the same as a total liquid holding capacity (or incipient wetness point) of clay support. The sodium silicate solution was added to the clay support, and the mixture was stirred with a spatula for 2-3 minutes at room temperature. The mixture was then heated to 100° C. or 120° C. for 1 or 3 hours, respectively. In some batches, different sodium silicate compositions were used (e.g., sodium silicate obtained from Sigma-Aldrich having a solid content 48.9% with $Na_2O:SiO_2$=1.3; D™ Sodium Silicate Solution from PQ Corporation having a solid content of 44.1% with $Na_2O:SiO_2$=1:2)

Example B4: Treatment with Sodium Silicate

Hydrochloric acid (1M) was added to a sodium silicate solution (D™ Sodium Silicate Solution from PQ Corporation having a solid content of 44.1% with $Na_2O:SiO_2=1:2$) until a pH of the solution dropped from 12.9 to around 9.0. The resulting solution (2.6 wt %) was added to water in which a total amount of liquid was the same as a total liquid holding capacity (or incipient wetness point) of clay support. The sodium silicate solution was added to the clay support, and the mixture was stirred with a spatula for 2-3 minutes at room temperature. The mixture was then heated to 100° C. for 3 hours.

Example B5: Preparation of Sorbent

The coated supports of the preceding examples were used to create different sorbent batches. To prepare each batch, a DEA solution were mixed together with coated support to impregnate DEA onto the coated support (e.g., to an amount of 24 wt % to 28 wt % of the sorbent). DEA impregnation was performed by stirring with spatula for 5 minutes at room temperature. Prior to the impregnation, both silica-coated support and DEA solution were pre-heated at 60° C. for 15-30 min to ensure good dispersion of DEA into the clay support pore structure. After the impregnation, the mixture was dried at 60° C. for 2-3 hours under $N_2$ atmosphere.

Example B6: Aging Analysis

Fresh $CO_2$ adsorption capacities were measured for the sorbents of Example B1 (2 wt % of TEOS, 28 wt % of DEA), Example B2 (5 wt % of colloidal silica stabilized by sodium ions, 28 wt % of DEA), Example B3 (2.6 wt % of sodium silicate, 24 wt % of DEA), and Example B4 (hydrochloric acid treated sodium silicate) as 10.42 g-$CO_2$/L-sorbent, 10.67 g-$CO_2$/L-sorbent, 10.75 g-$CO_2$/L-sorbent, and 10.05 g-$CO_2$/L-sorbent, respectively.

Sorbent aging was performed by placing the sorbent in an oven under air at 50° C. for 100 hours (unless otherwise indicated), after which $CO_2$ adsorption capacity was measured. After the aging, the sorbents of Example B1 (aged for 120 hours rather than 100), Example B2, and Example B3 exhibited $CO_2$ adsorption capacities reduced by 33%, 28%, and 11%, respectively. As a reference sample, 32 wt % of DEA coated onto clay support (with no silica coating) exhibited a $CO_2$ adsorption capacity reduced by 43% after aging. After 240 hours of the aging at 50° C. under air, the sorbent of Example B1 exhibited a $CO_2$ adsorption capacity reduced by 54%.

Figure 9:
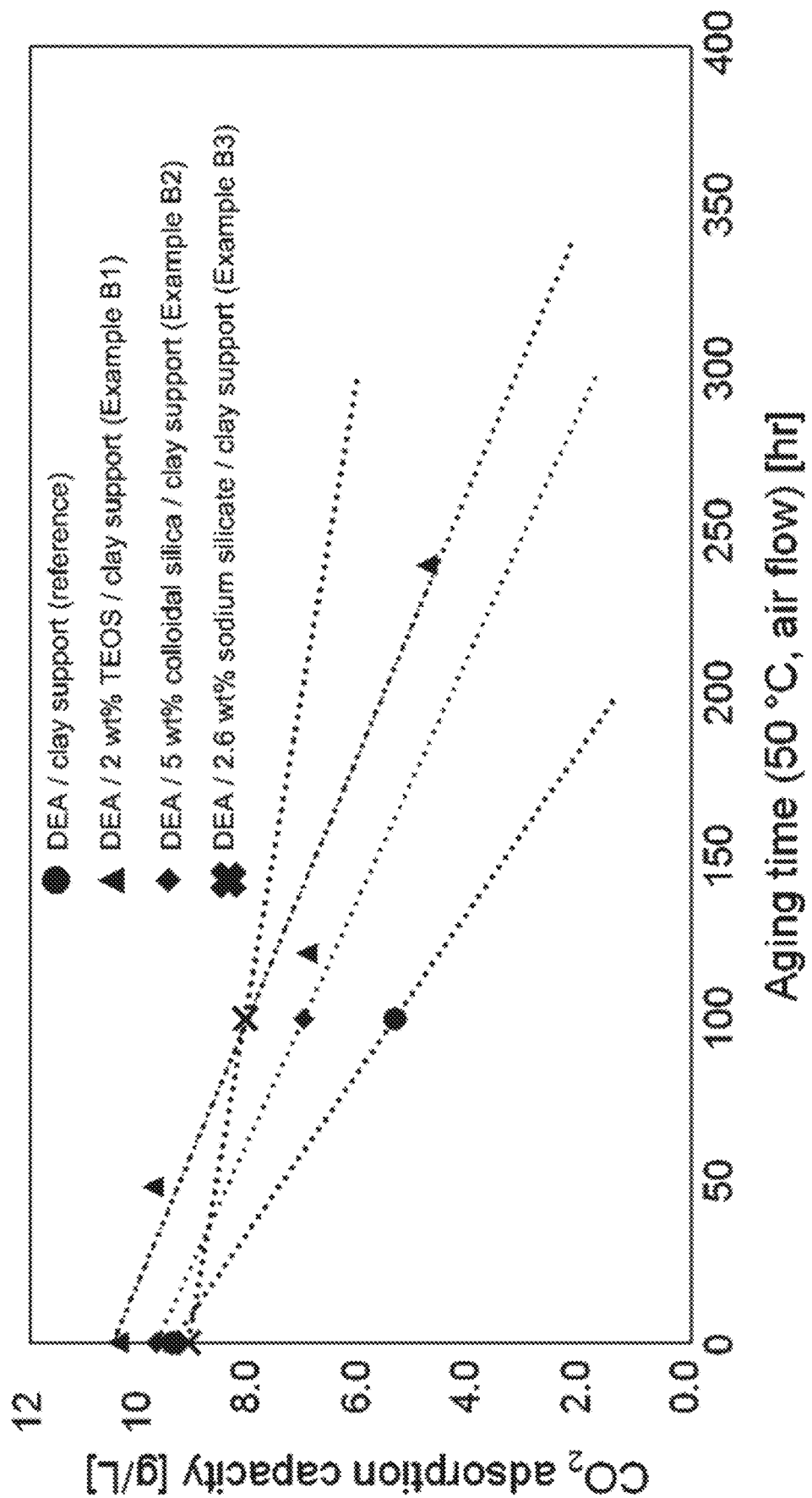
FIG. 9 illustrates the effects of aging time on $CO_2$ adsorption for various sorbents.

FIG. 9 is a plot showing the effects of aging time on $CO_2$ adsorption for the sorbents of Example B1, Example B2, and Example B3 compared to the reference sample.

Figure 10:
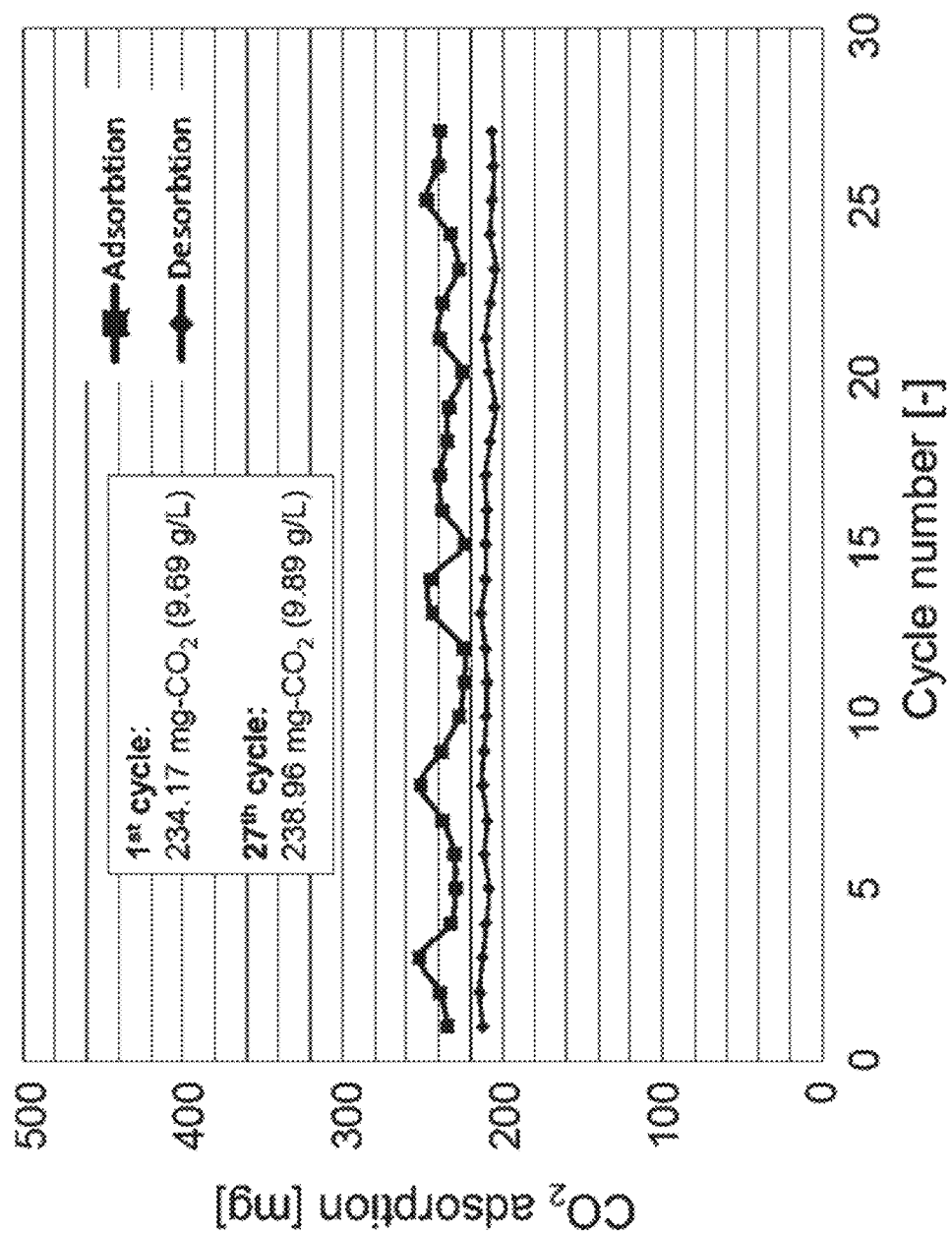
FIG. 10 illustrates $CO_2$ adsorption performance after several adsorption/desorption cycles.

FIG. 10 is a plot showing $CO_2$ adsorption cycling over several cycles for the sorbent of Example B1. The sorbent demonstrated stable performance over 27 cycles (i.e., 40.5 hours of consecutive operation).

Example B7: Attrition Resistance

Attrition tests were performed by placing a sorbent sample in a sieve (60 mesh, 250 μm) with 5 pennies and mechanically vibrating for 15 minutes. Attrition weight loss was computed as an amount of material lost through the sieve to a total initial weight of the sorbent. The attrition weight loss after performing an attrition resistance test on sorbents from Example B1, Example B2, Example B3, and Example B4 was 2.7 wt %, 3.8 wt %, 0.4 wt %, and 0.9 wt %, respectively. As a reference sample, the attrition weight loss after an attrition resistance test of 32 wt % of DEA coated onto clay support (with no silica coating) was 3.7 wt %.

In the foregoing description, numerous specific details are set forth, such as specific materials, dimensions, processes parameters, etc., to provide a thorough understanding of the embodiments of the present disclosure. The particular features, structures, materials, or characteristics may be combined in any suitable manner in one or more embodiments. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an embodiment", "certain embodiments", or "one embodiment" means that a particular feature, structure, or characteristic described in connection with the embodiment is included in at least one embodiment. Thus, the appearances of the phrase "an embodiment", "certain embodiments", or "one embodiment" in various places throughout this specification are not necessarily all referring to the same embodiment, and such references mean "at least one".

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method for producing a sorbent, the method comprising:
   forming a silicon-based coating on porous support particles to form a coated support by treating the porous support particles with a silicate solution; and
   impregnating the coated support with a gas-adsorbing material, the gas-adsorbing material comprising an amine compound.

2. The method of claim 1, wherein forming the silicate solution comprises one or more of tetraethylorthosilicate, or sodium silicate.

3. The method of claim 1, further comprising:
   calcining the coated support prior to forming the silicon-based coating or after forming the silicon-based coating.

4. The method of claim 3, wherein the calcining comprises calcining at a temperature ranging from 400° C. and 600° C.

5. The method of claim 1, wherein the amine compound comprises diethanolamine.

6. The method of claim 1, wherein a $CO_2$ adsorption capacity of the sorbent is greater than 8 g/L when the sorbent is maintained at a temperature greater than 20° C. and less than 40° C.

7. The method of claim 1, wherein the porous support particles comprise a clay.

8. The method of claim 1, wherein the porous support particles comprise one or more of bentonite, attapulgite, kaolinite, montmorillonite, ball clay, fuller's earth, hectorite, palygorskite, saponite, sepiolite, halloysite, silica, calcium sulfate, zeolite, synthetic zeolite, alumina, fumed silica, activated charcoal, or metal organic framework.

9. The method of claim 1, wherein the porous support particles comprise attapulgite.

10. The method of claim 1, wherein the porous support particles comprise silica having clay coated thereon.

11. The method of claim 1, wherein a surface area of the porous support particles is greater than 50 $m^2/g$ prior to impregnation with the gas-adsorbing material.

12. The method of claim 1, wherein an average pore volume of the sorbent is greater than 0.2 cc/g and less than 0.8 cc/g.

13. The method of claim 1, wherein the sorbent is in a form of granules.

14. The method of claim 13, wherein an average size of the granules ranges from about 0.25 mm to about 5 mm.

15. The method of claim 1, further comprising:
washcoating the sorbent onto a substrate selected from a porous ceramic honeycomb, a metallic honeycomb, or a polymeric foam.

16. The method of claim 1, wherein the porous support particles are in a form of a powder.

17. The method of claim 16, further comprising:
after impregnating the powder with the gas-adsorbing material, forming granules from the sorbent.

18. A method for producing a sorbent, the method comprising:
impregnating porous support particles with a gas-adsorbing material, the gas-adsorbing material comprising diethanolamine, wherein the porous support particles comprise a silicon-based coating having been formed by treatment of the porous support particles with a silicate solution.

19. The method of claim 18, further comprising:
calcining the porous support particles prior to the impregnating.

* * * * *